Patented Oct. 4, 1938

2,132,356

UNITED STATES PATENT OFFICE 2,132,356

CARBOXYLATION OF ALKALI METAL SALTS OF PHENOLS

Hans Z. Lecher, Plainfield, and Mario Scalera, Somerville, N. J., assignors to The Calco Chemical Co., Inc., Bound Brook, N. J., a corporation of Delaware No Drawing. Application April 29, 1937, Serial No. 139,712

20 Claims. (Cl. 260—521)

This invention relates to the carboxylation of alkali metal salts of phenols both mononuclear and polynuclear. More particularly, the invention relates to the carboxylation of alkali metal salts of phenols by causing them to react with carbon dioxide.

The carboxylation of alkali metal phenolates to produce corresponding hydroxy carboxylic acid derivatives is not a new reaction. The process, which is usually referred to as the Kolbe synthesis after its discoverer, is used particularly for preparing salicylic acid and 2-hydroxy-3-naphthoic acid on industrial scale. The industrial processes essentially consist in exposing the dry alkali metal phenolates to the reaction of carbon dioxide under pressure.

A number of practical difficulties are involved in these processes. The first difficulty lies in the necessity for absolutely anhydrous conditions as the presence of any considerable amount of moisture in the alkali metal phenolate prevents carboxylation. While it is a comparatively simple matter to produce anhydrous alkali metal salts of some mononuclear phenols, such as the phenol itself, the hygroscopic alkali metal salts of betanaphthol are very sensitive and are easily oxidized when exposed to air. The carboxylation reaction is exothermic and it is difficult to regulate. The difficulty is particularly acute when the reaction mixture passes through a sticky stage and stirring becomes difficult which results in local superheating. This is especially true in the case of the carboxylation of sodium betanaphtholate where side reactions take place and cause the formation of by-products such as xanthones, and even of tar. As a result, while satisfactory yields are obtainable in the carboxylation of sodium phenolate, the yields are very low with sodium betanaphtholate and in addition to the waste of material involved, extensive purification is necessary with resulting increased cost and, in many cases, with the production of a final product of lower purity.

It has been suggested to use inert diluents such as organic liquids or molten solids which do not dissolve alkali metal salts of phenols and which do not react with the starting materials, end product or intermediate products. Such diluents facilitate the preparation of anhydrous phenolate but they have an undesirable effect on the carboxylation reaction which is greatly retarded because carbon dioxide dissolves but sparingly in the diluent and the contact of carbon dioxide with the suspended and coated phenolate particles is poor.

It has been known that such phenolates dissolve in water and in alcohols. However, these solvents are not inert in the Kolbe reaction, but prevent it by forming the alkali carbonate and the free phenol. It has been known that alkali metal phenolates dissolve in phenols and such solutions, e. g., solutions of sodium betanaphtholate in betanaphthol had been employed in the Kolbe reaction. However, such phenolic solvents are not inert because they take part in reactions and equilibria involved. As a result, huge amounts of tar are formed when 2-hydroxy-3-naphthoic acid is prepared in a solution of sodium betanaphtholate in betanaphthol.

The present invention is based on the use as solvents of a certain class of heterocyclic compounds containing a six-membered ring with two oxygen atoms in the ring. These compounds possess the surprising property of dissolving alkali metal salts of phenols both mononuclear and polynuclear and at the same time are stable and inert chemically.

We do not claim in the present case the solutions of alkali metal salts of polynuclear phenols in these solvents as new products, this forming the subject matter of our copending application Serial No. 99,486, filed September 4, 1936.

The solvents used in the present invention include heterocyclic ethers containing ring systems included in the group consisting of 1,4 dioxane

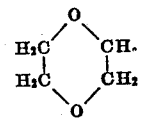

and 1,3 dioxane (metadioxane)

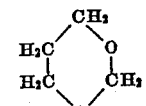

1,4 dioxene

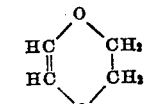

1,3 dioxene

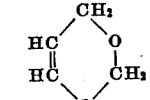

1,4 dioxine

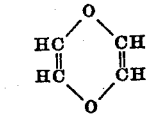

The simplest solvents of this type are dioxane, metadioxane and 1,4 dioxene. Derivatives containing these ring systems which are free from reactive groups may also be used for example, alkyl substituted and ether substituted derivatives such as 2.methyl metadioxane, 2,5 dimethylparadioxane, 2,3 diphenylparadioxane, 2,3 diethoxydioxane

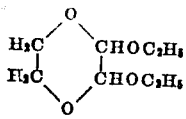

and the like. Condensed or polynuclear derivatives may also be used such as benzo 1,3 dioxene (saligenin methylene ether)

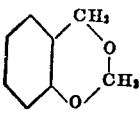

benzo 1,4 dioxene (pyrocatechol ethylene ether)

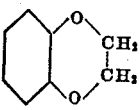

dibenzo 1,4 dioxene (diorthophenylene dioxide)

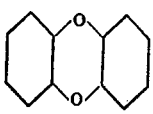

Compounds contain 2 dioxane rings are also useful such as the naphthodioxanes (glyoxal bisethylene acetals)

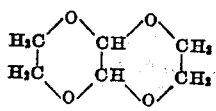

and the corresponding benzo compounds glyoxalbis-orthophenylene acetals

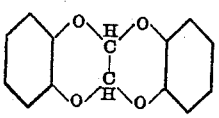

Some of these solvents are liquids at ordinary temperature such as 1,4-dioxane, and others are solids and, of course, are used as solvents above their melting point. As the Kolbe reaction is carried out at higher temperatures, also solvents which are solid at room temperature are entirely suitable. Because of its low price and good solvent action, 1,4-dioxane is the preferred solvent.

It has been found that anhydrous solutions of alkali metal salts of mononuclear and polynuclear phenols in these solvents can be easily obtained and reacted with carbon dioxide. The homogeneity of the reacting solutions prevents local superheating and tar formation, ensures a smooth reaction easy to control, and decreases the formation of by-products such as xanthones.

The most important phenol, the alkali metal salt of which can be carboxylated according to the present invention, is betanaphthol. However, the invention is not limited to this compound but is generally usable with phenols in which there are not sufficient polar groups to render their alkali metal salts insoluble in the solvents of the present invention. Examples of such other phenols are phenol, orthocresol, parachlorphenol, alphanaphthol, alpha and beta-anthrol, 5,6,7,8-tetrahydroalphanaphthol and 5,6,7,8-tetrahydrobetanaphthol, o- and p-benzyl-phenol, hydroxycarbazoles and hydroxynaphthocarbazoles. The solubility of all of the phenols is not the same in any one of the solvents of the present invention and the solubility of any given phenol in different solvents of the present invention of course will also vary. In many cases the solubility at lower temperatures is not sufficient and solutions must be prepared at higher temperatures. In some cases, this necessitates using some of the higher boiling heterocyclic solvents of the present invention. In each case, of course, the solvents best suited for the particular conditions will be chosen.

The solutions to be used in the present reaction may be prepared in many ways. Thus, for example, the alkali metal salt of the phenol may be dissolved in the solvent. In other cases, it is desirable to dissolve the phenol itself and react it with sodium or sodamide in the presence of the solvent.

Another important method of producing solutions to be used in the present invention is in connection with the production of phenol by an alkali fusion. Thus, for example, when a naphthalene monosulfonate is fused with caustic alkali to form the alkali naphtholate, this crude material which contains excess caustic alkali and alkali metal sulfite may be leached or otherwise treated with the solvent which will dissolve the alkali metal naphtholate or corresponding other phenol, leaving the sulfite and caustic alkali undissolved. This method is particularly advantageous because it eliminates any necessity of recovering the alkali metal salt of the phenol or the phenol itself from the melt, and is therefore much cheaper.

In another modification the phenol is caused to react with caustic alkali in the solvent. Water is produced by the salt formation and has to be removed. This dehydration is best effected by distilling off the water with or without a portion of the solvent which may be simultaneously replaced by fresh dry solvent. However, also dehydrating agents such as caustic alkali, calcium oxide, barium oxide, calcium carbide may be used. Dehydration with caustic alkali takes place at elevated temperature (between 50–100° C.) and produces a lower layer containing water and alkali. However, this procedure is not feasible with potassium betanaphtholate and KOH which form an insoluble dipotassium compound.

If the dehydration is effected by distillation, it may be carried out in the same vessel which is to be used for the carboxylation. Otherwise the dehydrated phenolate solution has to be siphoned off from the dehydrating agent and is to be sucked through a filter into the reaction vessel.

When the dry phenolate solutions are reacted with carbon dioxide at ordinary or slightly elevated temperature, the alkali metal salt of the carbonic ester forms first:

(a)     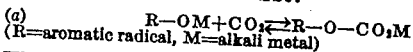
(R=aromatic radical, M=alkali metal)

These salts are very soluble in the relating solvents, much more than the corresponding phenol salts. This reaction is reversible.

However, there is another manner in which the phenolates react with carbon dioxide, very probably because of a tautomeric equilibrium:

(b) 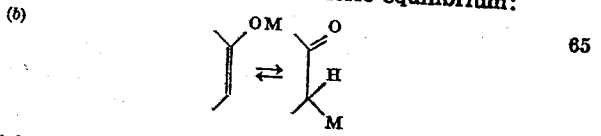

(c) 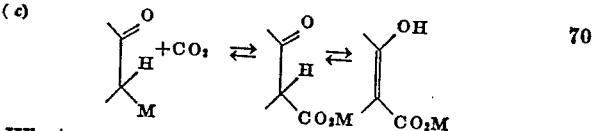

Whatever the explanation might be, by this other reaction sodium salts of hydroxycarboxylic acids are formed. These sodium salts are almost insoluble in the solvents used, precipitate and are thus removed from the equilibrium. Therefore, (f) 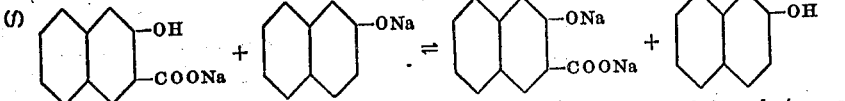

the salt of the carbonic ester gradually disappears and is replaced by the salt of the hydroxycarboxylic acid.

The optimum conditions for this carboxylation vary with the phenol and the solvent used. In some cases, e. g., in the formation of 2-hydroxy-1-naphthoic acid, the carboxylation takes place smoothly even at room temperature. In other cases, an elevated temperature is required. If the relating carboxylation is effected at lower temperature, carbon dioxide may be passed through the solution at atmospheric pressure. If a higher temperature is required, carbon dioxide must be applied under pressure in order to increase its solubility in the solvent. It is evident from the equations given above that the rate of reaction is increased by increasing the concentration of both reagents.

In some cases, particularly in the carboxylation of betanaphtholate, two isomeric acids may be formed. The salt of the valuable 2-hydroxy-3-naphthoic acid is only formed at a high temperature above 200°, preferably at about 230° to 270°. When the carboxylation is started at low temperature, the salt of the 2–1 isomer forms first; on heating it is decomposed because the reaction (d) 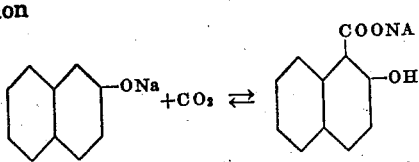

is reversible. The sodium betanaphtholate then fixes $CO_2$ at higher temperature in 3-position:

(e) 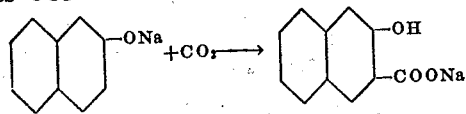

However, it is preferable to introduce carbon dioxide only at high temperature, e. g., at 230° to 270°, and to raise the pressure only slowly and not too high in order to avoid as far as possible the intermediate formation of the 2–1 isomer. For this latter isomer tends to form a naphthoxanthone

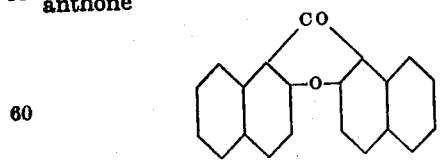

and also some tarry by-products which both are undesired in the manufacture of the 2,3-isomer. It is one of the advantages of this new process for making 2-hydroxy-3-naphthoic acid that the carbon dioxide may be reacted only at 250°, which could not be successfully done with solid sodium betanaphtholate because of a too violent reaction.

As mentioned above, the use of betanaphthol as solvent for sodium betanaphtholate in making 2-hydroxy-3-naphthoic acid had been known to the prior art, but it causes the formation of large quantities of tarry by-products. However, the presence of some free betanaphthol in the starting solution of sodium betanaphtholate has a very favorable effect upon the yield of this acid, probably because it shifts the equilibrium:

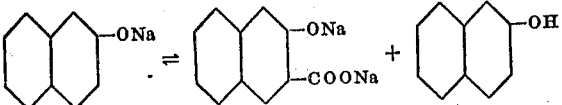

to the left side. A ratio of 1 part of free betanaphthol to 3 parts of dioxane is particularly favorable, but this ratio may be varied up to 1:1.

The material of the autoclave is likewise important. Iron is not only corroded but the iron compounds formed increase tremendously the formation of naphthoxanthone. Nickel and various nickel alloys are suitable materials.

The process of the present invention presents a number of important advantages, particularly for the commercial production of hydroxy-polynuclear carboxylic acids such as hydroxy-naphthoic acids. The first advantage is that carboxylation can be readily regulated and no difficulties are encountered resulting from local superheating or inadequate stirring. A second important advantage is the prevention or great reduction in the formation of by-products such as xanthones or tar. As a result, hydroxycarboxylic acids can be obtained in higher purity and with better yields. Thus, for example, when preparing 2-hydroxy-3-naphthoic acid, the ratio of acid obtained to nonusable by-products (naphthoxanthone, tar, etc.) is increased from 3:1 to 7:1.

The above advantages are applicable to all of the modifications of the present invention regardless of whether the alkali metal phenolate is used ready formed or whether it is produced and dehydrated in the solvent which then becomes the reaction mixture. In addition to these general advantages, the prefered modification of the present invention, in which the alkali metal phenolate is produced by reaction between the phenol and alkali in the solvent, possesses the further advantage that the expensive and difficult step of isolating the anhydrous alkali metal phenolate is eliminated which, of course, reduces the cost of the process by eliminating one of the troublesome steps which had hitherto been considered necessary by the art.

The invention will be described in greater detail in connection with the following specific examples which illustrate the typical embodiment of the invention, it being understood, of course, that the invention is not limited to the details set forth in the specific examples. The parts are parts by weight.

*Example 1*

29 parts alphanaphthol are dissolved in 206 parts of dioxane, 20 parts of powdered sodium hydroxide are added. The mixture is heated to boiling while being vigorously stirred. The hot solution of sodium alphahaphtholate is siphoned off from the lower aqueous layer. The dehydration is completed by heating the solution with 10 parts of fresh powdered sodium hydroxide. The hot solution is again siphoned off and it is saturated with carbon dioxide. Gradually the sodium salt of 1-hydroxy-2-naphthoic acid precipitates and is eventually filtered off by suction. From its aqueous solution the acid is precipitated upon acidification with sulfuric acid. It may be purified by dissolving it in sodium bicarbonate solution, filtering this solution, and reprecipitating the free 1-hydroxy-2-naphthoic acid with sulfuric acid. It has the formula

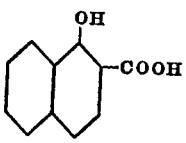

Example 2

18 parts of beta-naphthol are dissolved in 114 parts of dioxane; 5 parts of powdered sodium hydroxide are added, and the mixture is stirred without heating until all the caustic has dissolved. Then the vessel is heated, and the wet dioxane distilled off; as fast as the wet dioxane distills off, fresh dry dioxane is added through another opening. As the dioxane in the vessel grows drier, the boiling point of the distilling liquid rises, until it remains constant at 101.5° C. At this point the solution is efficiently dehydrated. It is then saturated with $CO_2$ at atmospheric pressure and at 50°–60°; then allowed to cool in a stream of $CO_2$. The sodium salt of 2-hydroxy-1-naphthoic acid precipitates as a white, crystalline powder; it is filtered, dried. The acid may be obtained by acidifying the aqueous solution of the salt. The dioxane solution contains some unchanged beta-naphthol and may be used for another batch after the addition of more beta-naphthol and sodium hydroxide. The acid obtained has the formula

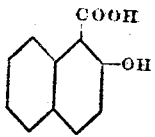

Example 3

1,975 parts of caustic soda (95%) and 400 parts of water are melted together in a fusion pot, and heated to 305° C. while stirred. Then 6,540 parts of moist sodium-beta-sulfonate (30% of water) are gradually added. The melt is kept at 300° C. for 6 hours, then cooled and ground. 7 parts of this melt containing a mixture of sodium hydroxide, sodium sulfite and sodium beta-naphtholate are mixed with 14 parts of dioxane and stirred for 15 minutes at 70–80° C. The insoluble inorganic material is filtered off and washed with 1.4 parts of dioxane. The dehydration and the carboxylation of the thus obtained naphtholate solution is carried out as in Example 2.

Example 4

36 parts of beta-naphthol are dissolved in 62 parts of dioxane. 20 parts of powdered sodium hydroxide are added. The mixture is stirred until a sample of the solution shows no precipitation on dilution with water. Then it is heated under reflux to 90–95° C. for 15–30 minutes while being continuously stirred. The caustic soda which is present in excess forms a lower aqueous layer and removes most of the water from the supernatant dioxane solution. This dioxane layer may be siphoned off directly into the reaction vessel and may be used as it is. However, the yields on 2-hydroxy-3-naphthoic acid are higher when the dioxane layer siphoned off is more completely dehydrated by refluxing it with 10–15 parts of finely ground calcium carbide for one hour; then the solution is siphoned through a filter into the reaction vessel.

The reaction vessel is an autoclave, preferably made from or clad with nickel, equipped with stirrer and inlet-tube for carbon dioxide and outlet-tube for distilling off dioxane. The sodium beta-naphtholate solution is heated to 250° C. and at this temperature the carboxylation is started by introducing $CO_2$. The partial pressure of carbon dioxide is kept preferably between 4 and 8 atm. and the temperature at 240°–260°. The carboxylation is interrupted after 6 to 10 hours.

The dehydrated sodium beta-naphtholate solution may be saturated with carbon dioxide also at atmospheric pressure and at 50°–60° C. In this case the sodium salt of 2-hydroxy-1-naphthoic acid precipitates. And then this mixture may be heated in the autoclave with or without further addition of carbon dioxide at 240–260° C. for about 8 hours. Or the sodium salt of 2-hydroxy-1-naphthoic acid may be isolated and then heated in fresh dry dioxane.

In any event, when the carboxylation is to be interrupted, the autoclave is allowed to cool. Its contents are treated with dilute caustic soda solution. The naphthoxanthone and other by-products formed are filtered off. The alkaline filtrate contains the unchanged beta-naphthol and the hydroxy-naphthoic acids as sodium salts. It is acidified with dilute sulfuric acid and boiled. Thus the 2-hydroxy-1-naphthoic acid is converted into beta-naphthol. The mixture is neutralized with sodium bicarbonate which dissolves only the 2-hydroxy-3-naphthoic acid and then filtered again. The acid is precipitated by dilute sulfuric acid.

If the dioxane is removed by distillation it may be recovered and the 2-hydroxy-1-naphthoic acid is decomposed. In this case only beta-naphthol and 2-hydroxy-3-naphthoic acid are obtained as final main products of the reaction.

Example 5

75 parts of beta-naphthol are dissolved in 310 parts of dioxane. 40 parts of powdered potassium hydroxide are added. The mixture is stirred until a sample of the solution dissolves completely in water. Then 75 parts of powdered sodium hydroxide are added, and the mixture is heated to 90–95° C. for 15–20 minutes. Two layers form, and the upper dioxane layer is siphoned off into another vessel where it is refluxed with 20 parts of powdered calcium carbide for one hour. The dehydrated solution of potassium beta-naphtholate is siphoned off through a filter into the autoclave. The further procedure is the same as in Example 4. 2-hydroxy-3-naphthoic acid besides unchanged beta-naphthol is obtained as main product.

Example 6

36 parts of beta-naphthol are dissolved in 83 parts of dioxane in an autoclave of the type mentioned in Example 3. 10 parts of caustic soda, preferably in powder form, are added. Upon stirring, it dissolves. The solution is now heated, the wet dioxane is distilled off from the autoclave and is gradually replaced by dry dioxane from a tank. The boiling point of the distilling liquid which at first contains about 20% of water, rises from 85°–90° C. until it reaches 101.2–101.5° C., the boiling point of pure dry dioxane. At this point the solution is effectively dehydrated. Dry dioxane is now distilled off or added so as to leave in the autoclave 60 parts of dioxane.

The autoclave is then heated to and kept at 250° C. The mixture is continuously stirred. $CO_2$ is gradually introduced until its partial pressure reaches 4–6 atm. After 10–12 hours the reaction is interrupted, the autoclave is cooled to 100°, the small residual pressure is released through a condenser, and the dioxane is recovered by distillation. The contents of the autoclave are worked up as described in Example 3.

It will be noted that in this and in the previous examples, dioxane solutions of naphtholate not containing any free naphthol have been used. The next example uses an excess of beta-naphthol and the dioxane solution contains some free naphthol.

Example 7

The quantities of raw materials are 5 parts of beta-naphthol, 1 part of sodium hydroxide, and 7.7 parts of dioxane. The preparation and the dehydration of the naphtholate solution is carried out as in Example 6. 4.5 parts of dry dioxane are left in the autoclave. The carboxylation is carried out as in Example 6, the partial pressure of $CO_2$ being raised from 2 to 6 atm. within 8 hours. The dioxane is distilled off from the autoclave and may be reused.

The residue in the autoclave is treated with 10 parts of hot water. The clear solution formed is siphoned off into another vessel where enough caustic soda solution is added to keep all the beta-naphthol dissolved. The naphthoxanthone and the other by-products are filtered off. From the filtrate first beta-naphthol is precipitated by addition of dilute sulfuric acid and is filtered off. It may be reused and is sufficiently pure. Then the 2-hydroxy-3-naphthoic acid is precipitated with more dilute sulfuric acid.

The acid obtained in the Examples 4–7 has the formula

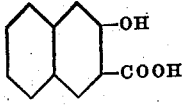

and is of excellent purity. Only a little naphthoxanthone and very little other by-products are formed.

Example 8

15 parts of beta-naphthol are dissolved in 100 parts of metadioxane. 10 parts of sodium hydroxide are added. The mixture is stirred and slowly heated up to 100° C. The sodium beta-naphtholate formed is dissolved and the water formed gives a lower layer with the excess of caustic soda. The two layers are separated above 85° C. and the metadioxane layer is dehydrated another time with 5 parts of sodium hydroxide. The dehydrated solution is filtered and saturated with carbon dioxide at 85° C. The sodium salt of 2-hydroxy-1-naphthoic acid separates. It is filtered off and washed with metadioxane, then dissolved in water. Dilute sulfuric acid precipitates the 2-hydroxy-1-naphthoic acid.

Example 9

A mixture of the two stereoisomeric naphthodioxanes is prepared by refluxing 2,3-dichloro-1,4-dioxane and ethylene glycol in benzene and adding potash and by recrystallizing from toluene. 15 parts of beta-naphthol and 120 parts of this naphthodioxane are molten together at 120–140° C. Then the equivalent amount of sodium hydroxide is added and dissolved in the stirred liquid. About one fifth of the naphthodioxane and the water formed are distilled off. The dehydrated solution is saturated with carbon dioxide at 120–130°; a thick precipitate forms. The hot mixture is treated with 5% sodium hydroxide solution. Upon cooling, the naphthodioxane crystallizes and it is filtered off. From the mother liquor, dilute sulfuric acid precipitates a mixture of unchanged beta-naphthol and 2-hydroxy-1-naphthoic acid which mixture is separated with sodium bicarbonate in the customary manner.

Example 10

10 parts of beta-naphthol are dissolved in 125 parts of benzo-1,4-dioxene. The equivalent amount of sodium hydroxide is added, and the mixture is slowly heated under stirring. At 120° C. a clear solution is obtained. The water formed is distilled off together with about one fifth of the benzo-1,4-dioxene employed. The solution is saturated with $CO_2$ at 80°; a precipitate forms. Beta-naphthol and 2-hydroxy-1-naphthoic acid are shaken out with caustic soda solution and separated in the usual manner.

Example 11

39 parts of p-benzyl-phenol are dissolved in 258 parts of dioxane. 8.3 parts of sodium hydroxide are added and dissolved under stirring and gentle heating. The dehydration is effected as in Example 6, 72 parts of dry dioxane are left in the autoclave. The carboxylation is carried out at 150° C. and under 6 atm. partial pressure of carbon dioxide for 8 hours. The separation of unchanged p-benzylphenol and of 2-hydroxy-5-benzylbenzoic acid is effected by the aid of bicarbonate. The acid obtained has the formula

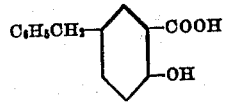

Example 12

44.4 parts of 5,6,7,8-tetrahydro-2-naphthol are dissolved in 207 parts of dioxane. The equivalent amount of powdered sodium hydroxide is added and dissolved under stirring and gentle heating. The dehydration is effected as in Example 6, 103 parts of dioxane are left in the autoclave. The carboxylation is carried out at 165° C. and under 6 atm. partial pressure of carbon dioxide for 8 hours. The separation of unchanged tetralol and 5,6,7,8-tetrahydro-2-hydroxy-3-naphthoic acid is effected by the aid of bicarbonate. The acid obtained has the formula:

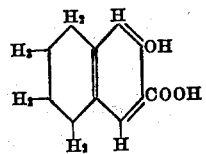

Example 13

15 parts of betaanthrol are dissolved in 258 parts of dioxane. The equivalent amount of powdered sodium hydroxide is added and dissolved under stirring and gentle heating. The dehydration is effected as in Example 6. 77 parts of dioxane are left in the remaining solution of sodium betaanthrolate which shows a green fluorescence.

The solution is saturated with $CO_2$ at 80° C. and kept at this temperature for 2 hours while $CO_2$ is slowly passed through. The separation of unchanged betaanthrol and 2-hydroxy-1-anthroic acid is effected by the aid of bicarbonate. The acid obtained has the formula:

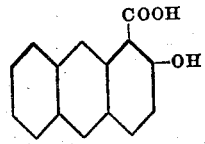

It will be noted that in the examples relating to the carboxylation of betanaphthol an excess of betanaphthol is used so that the solution contains not only sodium betanaphtholate but also free betanaphthol. We have found that this excess of betanaphthol improves the process and while it is in no sense critical, normally from 15 to 35% gives the best results.

We claim:

1. A method of carboxylating alkali metal salts of phenols which comprises subjecting to the action of carbon dioxide a substantially anhydrous solution of an alkali metal phenolate in a solvent containing as a major component a heterocyclic compound which has a six-membered ring with two oxygen atoms in the ring, and is free from groups capable of reacting with the reactants or reaction products.

2. A method according to claim 1 in which the action takes place out of contact with iron compounds.

3. A method according to claim 1 in which the reaction takes place in the absence of iron compounds and in equipment having a nickel containing surface exposed to the reaction mixture.

4. A method of carboxylating alkali metal salts of phenols which comprises subjecting to the action of carbon dioxide a substantially anhydrous solution of an alkali metal phenolate in a solvent containing dioxane as a major component.

5. A method of carboxylating alkali metal salts of phenols which comprises dissolving the phenol in a solvent containing as a major component a heterocyclic compound which has a six-membered ring with two oxygen atoms in the ring, reacting the phenol solution with an alkali to produce an alkali metal salt of the phenol in solution, dehydrating the solution and subjecting the solution, without isolation of the alkali metal phenolate, to the action of carbon dioxide, the heterocyclic compound being free from groups capable of reacting with the reactants or reaction products.

6. A method of carboxylating alkali metal salts of phenols which comprises dissolving the phenol in a solvent containing dioxane as a major component, reacting the phenol solution with an alkali to produce an alkali metal salt of the phenol in solution, dehydrating the solution and subjecting the solution, without isolation of the alkali metal phenolate, to the action of carbon dioxide.

7. A method according to claim 6 in which the dehydration is effected by an azeotropic distillation using dioxane as a component of the azeotropic mixture.

8. A method of carboxylating alkali metal salts of polynuclear phenols which comprises subjecting to the action of carbon dioxide a substantially anhydrous solution of an alkali metal phenolate in a solvent containing as a major component a heterocyclic compound which has a six-membered ring with two oxygen atoms in the ring and is free from groups capable of reacting with the reactants or reaction products.

9. A method of carboxylating alkali metal salts of polynuclear phenols which comprises subjecting to the action of carbon dioxide a substantially anhydrous solution of an alkali metal phenolate in a solvent containing dioxane as a major component.

10. A method of carboxylating alkali metal salts of polynuclear phenols which comprises dissolving the phenol in a solvent containing as a major component a heterocyclic compound which has a six-membered ring with two oxygen atoms in the ring, reacting the phenol solution with an alkali to produce an alkali metal salt of the phenol in solution, dehydrating the solution and subjecting the solution, without isolation of the alkali metal phenolate, to the action of carbon dioxide, the heterocyclic compound being free from groups capable of reacting with the reactants or reaction products.

11. A method of carboxylating alkali metal salts of polynuclear phenols which comprises dissolving the phenol in a solvent containing dioxane as a major component, reacting the phenol solution with an alkali to produce an alkali metal salt of the phenol in solution, dehydrating the solution and subjecting the solution, without isolation of the alkali metal phenolate, to the action of carbon dioxide.

12. A method according to claim 11 in which the dehydration is effected by azeotropic distillation using dioxane as a component of the azeotropic mixture.

13. A method of carboxylating alkali metal betanaphtholates which comprises subjecting to the action of carbon dioxide a substantially anhydrous solution of alkali metal betanaphtholate in a solvent containing as a major component a heterocyclic compound which has a six-membered ring with two oxygen atoms in the ring and is free from groups capable of reacting with the reactants or reaction products.

14. A method of carboxylating alkali metal betanaphtholates which comprises subjecting to the action of carbon dioxide a substantially anhydrous solution of an alkali metal betanaphtholate in a solvent containing dioxane as a major component.

15. A method of carboxylating alkali metal betanaphtholates which comprises dissolving betanaphthol in a solvent containing dioxane as a major component, reacting the betanaphthol with an alkali to form the alkali metal betanaphtholate in solution, dehydrating the solution and subjecting the solution, without isolation of the alkali metal betanaphtholate, to the action of carbon dioxide.

16. A method according to claim 15 in which the dehydration is effected by azeotropic distillation using dioxane as a component of the azeotropic mixture.

17. A method of carboxylating alkali metal betanaphtholates which comprises subjecting to the action of carbon dioxide at a temperature from 230-270° C. a substantially anhydrous solution of an alkali metal betanaphtholate in a solvent containing dioxane as a major component.

18. A method according to claim 17 in which the solvent contains free betanaphthol in addition to the dioxane.

19. A method according to claim 17 in which the solvent contains in addition to dioxane from 15 to 35% of betanaphthol.

20. A method according to claim 17 in which the solution of the alkali metal betanaphtholate is heated to reaction temperature of 230-270° C. in the absence of carbon dioxide and carbon dioxide is then introduced while maintaining the reaction mixture at the reaction temperature.

HANS Z. LECHER.
MARIO SCALERA.